United States Patent
Michaelis et al.

(10) Patent No.: US 8,037,414 B2
(45) Date of Patent: Oct. 11, 2011

(54) AUDIBLE COMPUTER USER INTERFACE METHOD AND APPARATUS

(75) Inventors: Paul Roller Michaelis, Louisville, CO (US); David S. Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 168 days.

(21) Appl. No.: 11/522,192

(22) Filed: Sep. 14, 2006

(65) Prior Publication Data

US 2008/0072154 A1    Mar. 20, 2008

(51) Int. Cl.
*G06F 3/16*    (2006.01)
(52) U.S. Cl. ...................................... 715/729
(58) Field of Classification Search ........... 715/727–729
See application file for complete search history.

(56) References Cited

U.S. PATENT DOCUMENTS

| | | | | | |
|---|---|---|---|---|---|
| 4,817,149 | A | * | 3/1989 | Myers ............................. | 381/1 |
| 4,912,466 | A | * | 3/1990 | Call ................................ | 341/20 |
| 5,374,924 | A | * | 12/1994 | McKiel, Jr. .................. | 340/825.19 |
| 5,461,399 | A | * | 10/1995 | Cragun ......................... | 715/729 |
| 5,734,805 | A | * | 3/1998 | Isensee et al. ................. | 345/419 |
| 5,862,229 | A | * | 1/1999 | Shimizu ........................ | 381/17 |
| 6,046,722 | A | * | 4/2000 | McKiel, Jr. .................. | 715/862 |
| 6,404,442 | B1 | * | 6/2002 | Hilpert et al. ................. | 715/727 |
| 6,469,712 | B1 | * | 10/2002 | Hilpert et al. ................. | 715/727 |
| 6,532,005 | B1 | * | 3/2003 | Campbell ..................... | 345/173 |
| 6,912,500 | B2 | * | 6/2005 | Hickey et al. ................. | 704/270 |
| 6,996,777 | B2 | * | 2/2006 | Hiipakka ....................... | 715/727 |
| 7,170,977 | B2 | | 1/2007 | Doherty et al. | |
| 2001/0047384 | A1 | * | 11/2001 | Croy ............................. | 709/203 |
| 2007/0192026 | A1 | * | 8/2007 | Lee et al. ...................... | 701/211 |
| 2007/0192699 | A1 | * | 8/2007 | Lee et al. ...................... | 715/727 |
| 2008/0072154 | A1 | * | 3/2008 | Michaelis et al. ............ | 715/727 |

FOREIGN PATENT DOCUMENTS

| | | |
|---|---|---|
| EP | 0 659 006 A2 | 6/1995 |
| EP | 0 762 717 A2 | 3/1997 |
| EP | 0982676 | 3/2000 |
| EP | 1039365 | 9/2000 |
| JP | 02123886 A | 11/1990 |
| JP | 2000029605 | 1/2000 |
| WO | 99/13395 | 3/1999 |
| WO | 99/41880 | 8/1999 |
| WO | 00/21024 | 4/2000 |
| WO | 00/39663 | 7/2000 |
| WO | 01/54110 | 7/2001 |
| WO | 01/59975 | 8/2001 |

OTHER PUBLICATIONS

Official Action for Canadian Patent Application No. 2,592,812, mailed Apr. 25, 2008.

(Continued)

*Primary Examiner* — Shelley Chen
(74) *Attorney, Agent, or Firm* — Sheridan Ross P.C.

(57) ABSTRACT

A computing system is provided that includes a display 124 for displaying information and an audible locating agent 148 that, as a pointer moves over the display, plays audible locating signals to identify spatial locations of at least some of the displayed information.

29 Claims, 6 Drawing Sheets

OTHER PUBLICATIONS

McKiel F Jr: "Audio-enabled graphical user interface for the blind or visually impaired" Feb. 1, 1992, Computing Applications to Assist Persons With Disabilities, 1992., Proceedings of the Johns Hopkins National Search for Laurel, MD, USA Feb. 1-5, 1992, Los Alamitos, CA, USA,IEEE Comput. Soc, US, pp. 185-187 XP010028045 ISBN: 978-0-8186-2730-9.

European Search Report and Opinion for European Patent Application No. 07115940.4, mailed Mar. 15, 2010.

Official Action for European Patent Application No. 07115940.4, dated Nov. 18, 2010.

Official Action for Canada Patent Application No. 2,592,812, mailed Jan. 20, 2011.

Tanigawa et al.; "Personal Multimedia-Multipoint Teleconference System"; NTT laboratories, Japan; pp. 1127-1134, Mar. 1991.

AFB—American Foundation for the Blind; "Blindness Statistics"; http://www.afb.org/Section.asp?SectionID=15; printed Jul. 12, 2006; 5 pages.

AFB—American Foundation for the Blind; "Key Definitions of Statistical Terms"; http://www.afb.org/Section.asp?SectionID=15&DocumentID=1280; printed Jul. 12, 2006; 2 pages.

GW Micro; "Welcome to GW Micro"; http://www.gwmicro.com/; printed Jul. 13, 2006; 3 pages.

Enable Mart; "Window-Eyes 5.5"; http://enablemart.com/productdetail.aspx?store=10&pid=379&dept=12; printed Jul. 13, 2006; 6 pages.

NanoPac, Inc.; "GW Micro's Window-Eyes Screen Reader"; http://www.nanopac.com/WindowEyes.htm; printed Jul. 13, 2006; 4 pages.

JAWS for Windows Information; JAWS for Windows; http://www.freedomscientific.com/fs_products/software_jawsinfo.asp; printed Jul. 12, 2006; 2 pages.

JAWS for Windows Overview; JAWS for Windows; http://www.freedomscientific.com/fs_products/software_jaws.asp; printed Jul. 12, 2006; 3 pages.

JAWS for Windows ; JAWS for Windows Quick Start Guide; Published by Freedom Scientific BLV Group, LLC; May 2006; 32 pages.

JAWS for Windows 7.10; What's New in JAWS 7.10; http://www.freedomscientific.com/fs_products/software_jaws710fea.asp; printed Jul. 12, 2006; 31 pages.

\* cited by examiner

AUDIBLE COMPUTER USER INTERFACE METHOD AND APPARATUS

FIELD OF THE INVENTION

The invention relates generally to computing systems and particularly to user interfaces for computing systems.

BACKGROUND OF THE INVENTION

Graphical user interfaces have replaced text-only interfaces in the vast majority of today's computer environments. The typical graphical user interface conveys at least some of the information to users via non-text images. Items may be selected or activated through the use of a point-and-click device, such as a mouse or trackball. It is important to note that point-and-click targets may occur anywhere on the screen.

The most popular graphically oriented operating systems are the windows-based offerings of Microsoft Corporation, with Windows 95™, Windows 98™, Windows for Workgroups™, Windows NT™, Windows 2000™, Windows 2003™, Windows ME ™, and Windows XP™ being examples. A "window" is an area of the display set aside for a specific purpose. Within each window, there will often be graphical images, as well as many different locations that can be targets for the point-and-click devices.

One feature of the typical modern computer is that it is able to perform many tasks simultaneously. The modern graphical user interface reflects this capability by allowing many different windows to be "open" simultaneously, with each window corresponding to a different piece of software, or application program. Thus, different application programs can be displayed simultaneously in different windows. The window commonly has visible boundaries within which information is displayed by the corresponding application program. The active window is the window with which the user is currently interacting while an inactive window is an open, but not currently active, window. (To illustrate the difference, although visible changes can occur in any window that is open—i.e., any window that is being displayed on the screen—the active window is the one in which users' keyboard entries will have an effect. If windows overlap, the active window will appear to be the one on top, concealing portions of the other windows in locations where they overlap.) The user can control the size, shape, and positioning of the windows by appropriate positioning of the cursor and keyboard/mouse commands.

Because windows can overlap and "hide" one another, a display tool bar is provided in windows-based operating systems. This tool bar may be positioned by users along any edge of the screen (most prefer the bottom edge); it contains icons that represent applications that may be invoked, as well as individual icons that correspond to each of the open windows.

As the number of windows opened becomes large, the display tool bar can become increasingly crowded with icons and unhelpful to the user. To make matters worse, the ordering of the window icons in the tool bar do not reflect the precise ordering of the window stack. The icons are ordered based upon the relative timing of when the windows were opened and not based upon the relative positions of the windows on the display. This forces the user to periodically click on the windows to identify which windows are open and rearrange them so that a part of each opened window is visible. Additionally, windows-based operating systems normally require two hands and full attention to operate. The user must not only view the display but also make selections or enter data via a point-and-click device, e.g., a mouse, a track ball, joy stick, stylus, etc. In many implementations, the user does not have the convenience of providing both hands and complete attention to the computer, thereby diminishing the attractiveness and decreasing the productivity of the operating system. For example, when operating a vehicle, it can be unsafe for a driver to view and operate a device that utilizes a visual display. There are situations, such as night-time use of the device, where illuminated displays are undesirable due to the adverse impact on the user's night vision. Similarly, the use of an illuminated display by military personnel at night may be undesirable because the illumination can reveal the user's location.

Another consideration is that disability access is increasingly becoming an important issue to software and hardware manufacturers. Many countries are enacting stringent laws requiring products to have specific features that permit the products to be operated by people with disabilities. An illustrative example is Section 508 of the Rehabilitation Act of 1998 (29 U.S.C. §794d). The requirements associated with this legislation, that apply specifically to computer-based graphical user interfaces, are in the Code of Federal Regulations, 36 CFR Parts 1194.21 and 1194.22. The majority of these requirements are oriented toward people who unable to see. For example, regulation 1194.21(a) requires all operations to be accessible via the computer keyboard—i.e., without a point-and-click device. This regulation is necessary because people who are blind are unable to discern the position of the on-screen pointer, the locations of targets within windows, and the relative positions and borders of the different windows that may be open.

In order to operate graphical user interfaces, people who are blind rely on sophisticated text-to-speech assistive software applications, such as Microsoft Narrator™, JAWS™ by Freedom Scientific BLV Group, LLC, and Window-Eyes™ by GW Micro. Navigation within and between windows is accomplished by using the TAB, ALT, and arrow keys, either singly or in combination with other keys. For example, pressing TAB within a typical window causes the programmatic focus to move to the next tab-stop or point-and-click target. With each press of the TAB key, the text-to-speech software provides a spoken description of the target. (Section 508 regulation 1194.22(a) requires all non-text elements to have an underlying text tag. This is what permits the text-to-speech software to respond appropriately when the TAB function takes the focus to an icon or other graphical image.) When the desired target is voiced-out, the function may be executed by pressing the ENTER key.

A similar mechanism allows users to move among different applications, and to select the window to be activated. This is accomplished by pressing the ALT key continuously while pressing and releasing the TAB key. With each press of the TAB key, users may move sequentially through the windows that have been opened. The sequence of movement is in chronological order, starting with the window that had been activated most recently. (Note that the order in which the icons appear in the tool bar is based on the sequence in which the corresponding windows were first opened, not the sequence in which the windows had been activated.) Immediately after each release of the TAB key (but not the ALT key), the assistive text-to-speech software will read the title bar of the selected window. When the user hears the software speak the title of the desired window, the user causes that window to be activated by releasing the ALT key.

Although support for keyboard-based control does permit graphical user interfaces to be operated by people who are blind, this style of operation is considerably slower and more tedious than what is available to people who are able to operate point-and-click devices. To reiterate a point made earlier, the fundamental problem is that blind users are unable to discern the position of the on-screen pointer, the locations of targets within windows, and the relative positions and borders of the different windows that may be open. In this context, it is important to note that sighted users often form a mental map of where desirable point-and-click targets are located, thereby permitting them to move the pointer to the target very quickly. The lack of memorable location-specific data in the information presented to blind users represents one more operational advantage that is presently available only to sighted users.

SUMMARY OF THE INVENTION

These and other needs are addressed by the various embodiments and configurations of the present invention. The present invention is directed generally to a method and system for locating objects on a display.

In a first embodiment a method is provided that includes the steps:

(a) providing an electronic display and user interface style in which the locations of objects that are being displayed is of importance; and (b) as a pointer and/or programmatic focus indicator moves over the display, playing a plurality of audible locating signals to identify spatial locations of at least some of the displayed information and/or successive positions of the pointer and/or focus indicator.

In one configuration, the display is divided into a series of segments, with each segment being associated with a unique set of acoustic parameters. When the pointer and/or programmatic focus indicator traverses a boundary of a selected segment and/or when the pointer and/or programmatic focus indicator is positioned in the selected segment, the locating signal played has the unique set of acoustic parameters associated with the selected segment. Each segment corresponds to a plurality of display pixels, and the set of acoustic parameters includes one or more of phase, frequency, magnitude, cadence, and echo.

In one configuration, the locating signal indicates a spatial location relative to a two-dimensional coordinate system. In a first dimension, a first acoustic parameter is varied, and, in a second dimension, a second acoustic parameter is varied. The first and second acoustic parameters are different. Their values can vary independently. The signals themselves are psychoacoustically separable, such that the value of each is independently discernible.

By way of example, the first acoustic parameter can be the acoustic frequency of the signal, and the second parameter synthesized acoustic phase delay, one ear versus the other. Typically, a first frequency associated with a first segment differs by at least an amount equal to a psychoacoustic "just noticeable difference" from a second frequency associated with a second adjacent segment. (For most people, a "just noticeable difference" in acoustic frequency will be less than the difference associated with adjacent musical notes.) Keeping in mind that the human auditory mechanism relies on perceived phase differences, left ear versus right ear, in order to do lateral sound-source localization, a first synthesized phase difference associated with a third segment differs by at least an amount equal to a psychoacoustic "just noticeable difference" from a second phase presentation associated with a fourth adjacent segment. (For most people, a "just noticeable difference" in phase delay, one ear versus the other, equates approximately to a two degree shift in the perceived location of the sound source.) In a preferred implementation of a two-dimensional acoustic signaling system, frequency differences would be indicative of position along a vertical axis, and phase differences, one ear versus the other, would indicate position along a horizontal axis.

In one configuration, the locating signal indicates a spatial location relative to a three-dimensional coordinate system, and, in the third dimension, a third acoustic parameter is varied. The first, second, and third acoustic parameters are different, independently variable, and individually discernible.

In yet another embodiment, a method is provided that includes the steps:

(a) at a first time, audibly providing to a user an identifying signal identifying a corresponding displayed image and, in temporal proximity thereto, a locating signal identifying a spatial location of the displayed image on a display; and (b) at a second time, audibly providing to the user one or more locating signal(s) indicating a spatial location of a pointer.

In this manner, a user is able to move the pointer to the position of the displayed image based on a degree of similarity of the locating signal associated with the image to a selected locating signal associated with the pointer.

The invention effectively provides an audible user interface. For example, the location of the point-and-click indicator, as well as the location of clickable "hot spots" on the display, are indicated acoustically, e.g., acoustical phase position for the left-right axis, increase or decrease in frequency for vertical axis. Because acoustic phasing is not a useful indicator of left-right location for frequencies above approximately 1500 Hz, a preferred implementation could use this as the frequency to indicate "top of the screen," with one octave below that—750 Hz—to indicate the mid-point, and two octaves below 1500 Hz—i.e., 375 Hz—as the bottom of the screen.

The user interface could substitute level, cadence or other similar effects for generation of the relative position. When a user is navigating with such a user interface, the various locations of icons, tool bars, drop downs and the like could be identified by a select combination of frequency and phase or similar pairing. In a preferred implementation of this approach, the acoustic location information would be provided in conjunction with the voiced output generated by traditional assistive text-to-speech adjuncts (e.g., Narrator, JAWS, or Window-Eyes). This would permit blind users to learn the physical on-screen locations of desirable targets. Without using vision, a user could move the point-and-click pointer to any of those locations simply by listening to the pointer's sound, while moving the pointer in order to make its sound align with the sound of the desired target.

The user could learn to navigate in exactly the same way that many users have learned to identify the DTMF pair tones associated with specific keys on a telephone key pad. Further, if the user stops between two icons, the interface could generate an announcement that states you are between A and B, which would you like to select. Once located on a specific icon, tool bar tool, or drop down, it can announce the function selected. In such a way, the user can navigate a screen based on auditory cues rather than visual identification of a cursor. Further, the idea can be used to navigate amongst selections without the need for any display whatsoever. As a result, this is more than just an audible means of navigating an existing screen, it can allow a user interface to function in the absense of any screen. The idea can be extended to a user interface that is actuated with buttons, joysticks, mouse and trackball type devices, with gaze detection or a variety of other position indicating devices. While there are games in the prior art that generate sounds that correlate with an event or position, it is not for the purpose of navigation of a user interface but instead is feedback from the game to the user based on the events of that game.

The present invention can provide a number of advantages depending on the particular configuration. By way of example, the user, whether or not visually impaired, would be able to identify quickly and conveniently the locations of displayed objects, such as windows, hot spots, tool bars, based on auditory locating signals. This can provide substantial improvements in the ability of users to multitask and in productivity generally. The user does not require two hands, good eyesight, and concentration on the display to manipulate the pointer to desired locations to perform selected functions.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
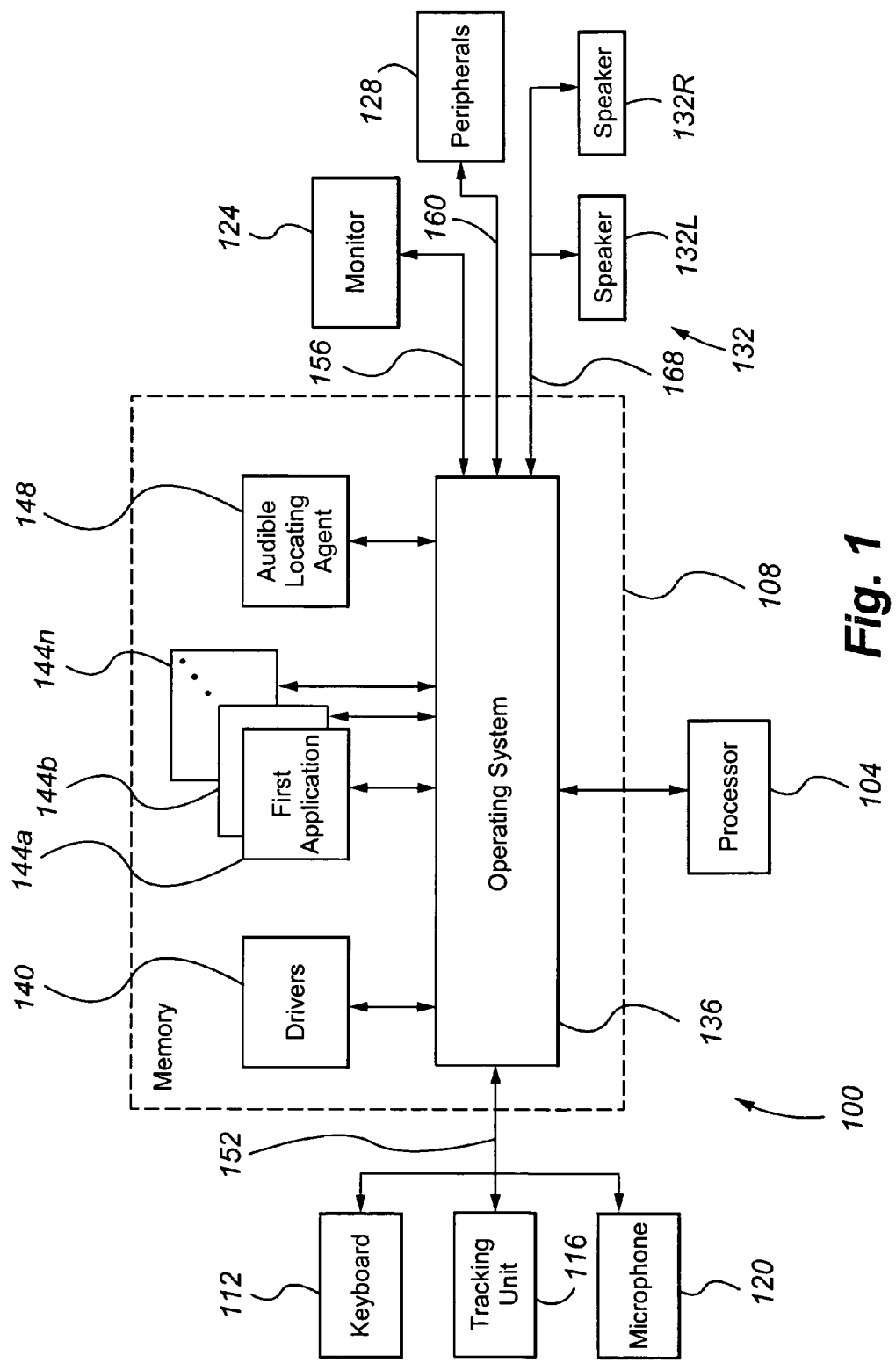
FIG. 1 is a block diagram of a computer system according to an embodiment of the present invention.

A computer system 100 according to the present invention is depicted in FIG. 1. The system 100 includes a processor 104, memory 108, keyboard 112, a tracking unit 116, microphone 120, monitor 124, speaker array 132 (with 132R and 132L signifying the right and left speakers in the array), and (other) peripherals 128. The keyboard 112, tracking unit 116, microphone 120, monitor 124, speakers 132, and peripherals 128 are generally external to the computer (which includes the processor 104 and memory 108) and are connected to the computer by serial or parallel links (e.g., serial or parallel buses).

The processor 104 is a functional unit that interprets and executes instructions. It typically includes instruction control and arithmetic and logic units. It is commonly an integrated circuit containing central processing units. A typical processor is a microprocessor.

The memory 108 can be any storage medium and includes all of the addressable storage space in the system 100. Typically, memory 108 is a combination of read-only and random-access memory.

The keyboard 112 provides the primary computer input for alphanumeric data.

The tracking unit 116 is a hand manipulated unit that moves the cursor, or mouse pointer, to a desired position on the display, repositions displayed objects, and invokes desired features/functions. Exemplary tracking units 116 include a mouse, stylus, joy stick, and trackball.

The microphone 120 and speakers 132 can be any suitable microphone or speakers, respectively, and may be located internal or external to the system 100.

The monitor 124 is a video display terminal that accepts video signals and displays information on its screen. The monitor typically has a plurality of pixels, with the density of pixels being indicative of the resolution of the displayed information.

Finally, peripherals 128 are external devices that support the operations of the system. Examples of peripherals include printers, external tape drives, and external hard drives.

While the present invention is described with reference to a Personal Computer or laptop computer, it is to be understood that it is not limited to microcomputers but can be applied to any other computing system.

Memory 108 includes an operating system 136, drivers 140, a plurality of applications 144a-n, and an audible locating agent 148. The memory 108 can include other, or fewer, computational modules depending on the application.

The operating system 136 is a set of instructions that controls the execution of programs and may provide services, such as resource allocation, scheduling, input/output control and data management. The operating system 136 is preferably a graphical operating system, with window-based systems being preferred. A particularly preferred operating system is a Windows™ operating system by Microsoft.

The drivers 140 contain information to run a particular computational module, such as a plotter, printer, port, speaker, microphone, disk or tape drive, video card, and mouse.

The plurality of applications 144a-n are application programs that perform a variety of selected tasks. The applications can include, for example, spreadsheet programs such as Excel™, messaging and calendar management or scheduling programs such as Outlook™, word processors such as Word™ and WordPerfect™, accounting systems, engineering programs, graphics programs, voice and speech recognition programs (e.g., Text-To-Speech (TTS) and Speech-To-Text (STT) programs), and disability access software, such as JAWS™ and Window Eyes™.

The audible locating agent 148 provides audible location signals regarding the location of various objects displayed on the monitor 124. The displayed objects can be an icon or part thereof, a window or part thereof, a data field, a file folder, a hot spot, cursor, link (e.g., hyperlink), Computer Display Controls, Tool Bar or a part thereof, Desktop or a part thereof, a programmatic focus indicator, and the like. As will be appreciated, a programmatic focus identifies the user-selectable field, such as a link, icon, file folder, hot spot, and the like, that would be activated is the user were to press the ENTER key on their keyboard. The programmatic focus indicator may be, but is not necessarily, the same as the cursor. The programmatic focus indicator is typically moved from field-to-field by the TAB or arrow keys, and highlights the user selectable action. The audible location signal can take many forms. It may, for example, be a discrete or continuous signal. Typically, one or more acoustic parameters of the location signal is associated with a specific location or set of locations on the display. The acoustic parameter may be phase, frequency or pitch, magnitude or gain, cadence, echo, signal interval (between adjacent, discontinuous signals), and signal duration. The acoustic parameter is varied as the cursor is moved across the display to inform the user of the position of the cursor on the display.

Figure 2:
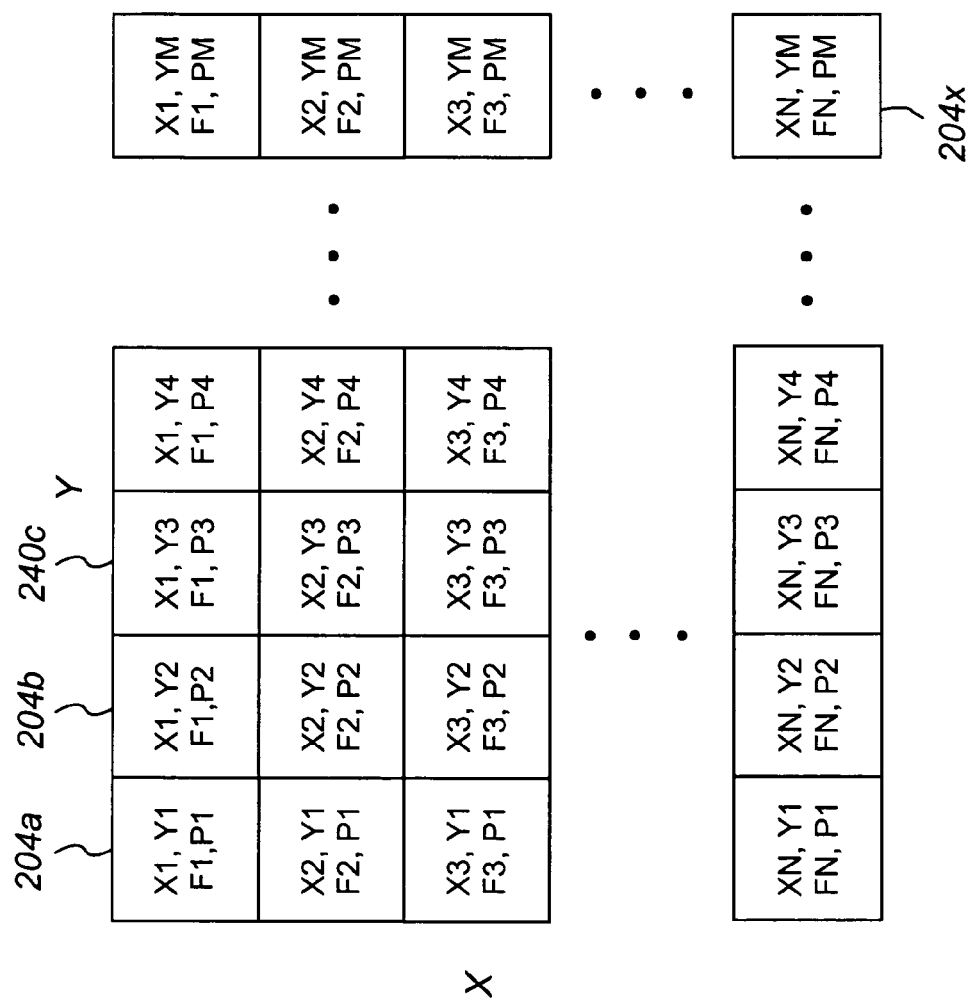
FIG. 2 depicts display segmentation according to an embodiment of the present invention.

FIG. 2 depicts an exemplary segmented display 200 according to one configuration. The display is shown as having two dimensions, namely X and Y. Each segment 204a-x has associated sets of spatial (X,Y) coordinates and acoustic parameters. The spatial (XY) coordinates normally refer to a designated point (e.g., mid-point) of the segment but may be a range of coordinates covering a defined span of the segment. A segment may correspond to a pixel but typically refers to a set, or plurality, of pixels. Preferably, each set of acoustic parameters is associated uniquely with a corresponding set of spatial coordinates. The acoustic parameters shown in FIG. 2 are Phase difference, one ear versus the other (P), and Frequency (F). For a given X coordinate, the phase difference, one ear versus the other, is maintained constant while frequency varies as a function of location along the Y axis. For a given Y coordinate, frequency is maintained constant while the phase difference varies as a function of location along the X axis. As a result, each XY location in the two-dimensional grid will have its own unique acoustic signature. With regard to the horizontal (X) axis, the manner of presentation in the preferred embodiment is consistent with user expectations, in that the synthesized acoustic signature will sound as though it is originating from the point on the screen where it is actually located. With regard to the vertical (Y) axis, the manner of presentation is consistent with user expectations, in that the acoustic frequency is higher for objects that are higher on the screen.

It is important to note that the ability to manipulate acoustic signals, to cause them to be perceived as coming from specific locations, is an essential component of the preferred embodiments. For this reason, it is appropriate to review how the human auditory mechanism determines a sound's point-of-origin:

It is often assumed, mistakenly, that people judge the direction from which sounds originate by comparing the relative loudness of the sound, one ear versus the other. Although comparative loudness is useful when assessing sounds that are chiefly high frequency in nature, this is not the human brain's primary direction-location mechanism for sounds that have a significant low frequency component. For sounds such as these, the relative phasing of the sound waves is the key factor.

To illustrate how the human auditory processing mechanism perceives the direction from which low frequency sounds originate, consider a sound that consists of a pure 500 Hz tone. If this sound is originating from a point exactly in front of where an individual is facing, the sound waves will hit that person's left and right ears at the same time. The sound will be perceived by the person as originating from a point that is on a plane perpendicular to a line drawn between the person's two ears, intersecting the ear-to-ear line at its mid-point. But what happens if this 500 Hz sound originates from a source that is to the person's side, rather than directly in front of them?

At sea level, the speed of sound through air is approximately 12 inches per millisecond. This means that the wavelength of a 500 Hz tone is approximately 24 inches. If we assume for the sake of illustration that the distance between a person's two ears is approximately six inches, this means the peaks of a 500 Hz sinusoidal sound wave, originating from a source directly to the listener's side, would now be approximately 90 degrees out of phase, one ear with respect to the other. Specifically, sound waves will hit the ear that is facing away from the sound approximately ½ millisecond after they hit the ear that is facing the sound. This time delay is detected by the brain, and is the basis for determining the sound's point-of-origin. (Note: The actual value for the speed of sound through air is closer to 11.27 inches per millisecond, assuming low humidity and 20 degrees C. temperature. Approximate numbers were used in this example in order to simplify the explanation.)

Continuing with this example, if the sound is originating from a point that is between 0 and 90 degrees off-axis, the time delay will be less than ½ millisecond. This, too, is detected by the brain, and is the basis for deciding that the point-of-original is not directly to the front or directly to the side.

To illustrate why comparative phasing is not useful for higher frequency sounds, consider a pure tone of 2000 Hz. If this sound is originating from a point directly to someone's side, the sound waves, one ear with respect to the other, would be 360 degrees out of phase. In other words, the wave peaks would hit both ears simultaneously, thereby making phase-based localization impractical. Although there are components of human speech—notably the vocal tract resonances commonly referred to as formants—that have frequency contents in this range and higher, it is important to note that the fundamental pitch for the human voice is typically between 100 and 300 Hz. As a result, despite the presence of high frequency sounds in human speech, comparative phasing is the primary mechanism employed by the human brain to determine the direction from which a speech sound is originating.

Moving away now from simple illustrative examples to a more precise examination of the relevant biophysics, the formula for calculating Interaural Phase Difference (IPD) is equal to approximately 763 µs×Sin of the Differential Azimuth Angle (considering diffraction effects associated with the human head). Experimental data show that a differential phase at a frequency of 500 Hz is audible to many humans with as small a change as one or two degrees. Keeping in mind that most people cannot hear frequencies above 15,000 Hz, it seems counterintuitive that the human auditory mechanism can detect an inter-aural time difference of as little as 13-26 µs, but this finding has been proven under controlled experiments conducted at the sound localization research center at Wright Patterson Air Force Base in Dayton, Ohio. Based on their research, the ear relies almost purely on differential phase for localization below 1500 Hz and relies on differential amplitude level at frequencies above 3000 Hz. At frequencies close to 2000 Hz, for reasons described previously, the human auditory mechanism tends to be a very poor judge of sound localization. This is why a preferred implementation of the present invention would use 1500 Hz as the frequency to indicate "top of the screen,"with one octave below that—750 Hz—to indicate the mid-point, and two octaves below 1500 Hz—i.e., 375 Hz—as the bottom of the screen.

In one configuration of the present invention, the user would have stereophonic headphones or speakers. The signals to the left and right ears are not identical. Specifically, the locating signals reflect time-shifting to provide an audible difference to how the signal is perceived by the user's left ear versus right ear. The time shifting is by an amount that is associated with the phase difference for the spatial location corresponding to the locating signal. The purpose of this time-shifting is to allow the user to perceive that each locating signal is coming from different, easily identifiable direction.

By way of example, the computer may deliver a first locating signal to the user's right ear approximately 500 µs after delivering it to the left, thereby causing the user to perceive that the associated location is to his left. Similarly, the computer may deliver a second locating signal immediately to the listener's right ear, and impose a 500 μs delay on the signal to the left ear, thereby causing the user to perceive that the corresponding location is to his right. If the computer were not to impose any delay on a third locating signal, the corresponding location would be perceived as coming from a central location, midway between the other two locations.

With regard to the maximum number of individual locating signals that can be detected reliably (and, by extension, the maximum number of locations that could be supported by the present invention), if one assumes that a five degree difference in locating signals is reliably discernible by the human ear, a system that localized the signals at five degree intervals, starting at 90 degrees to the left and ending at 90 degrees to the right, would support 39 corresponding locations along the X axis.

In use, as the cursor (or programmatic focus indicator) moves from segment-to-segment, the speakers 132R and 132L (i.e., the speakers to the right and to the left of the user) generate a plurality of audible locating signals having varying acoustic characteristics. The signals are normally generated when the cursor (or focus indicator) reaches a designated point in each segment (e.g., as the cursor crosses or traverses a boundary) and is generated for a determined period of time while the cursor (or focus indicator) is positioned within the corresponding segment 204. If the cursor (or focus indicator) is at rest in the segment for longer than the determined period of time, the signal is ceased unless the user indicates a desire to have the signal replayed to remind him or her of the cursor (or focus indicator) position. Such a desire can be indicated by a key or button press, shaking or moving back-and-forth the tracking unit 116, and the like. When a displayed image spans multiple segments 204, the signals are still generated as it will assist the user in determining his or her location in the window as well as on the display generally.

In one configuration, the agent 148 works with a disability access application, such as JAWS™ or Window Eyes™, to provide spatial or location information in addition to the audible identification of an object. In other words, if the disability access application were to identify a field when the cursor (or focus indicator) moves to the field, the agent 148 would also provide the audible location signal corresponding to the segment 204 at which the field is positioned. In this way, the user knows not only the field identity but also field position for later use.

Figure 3:
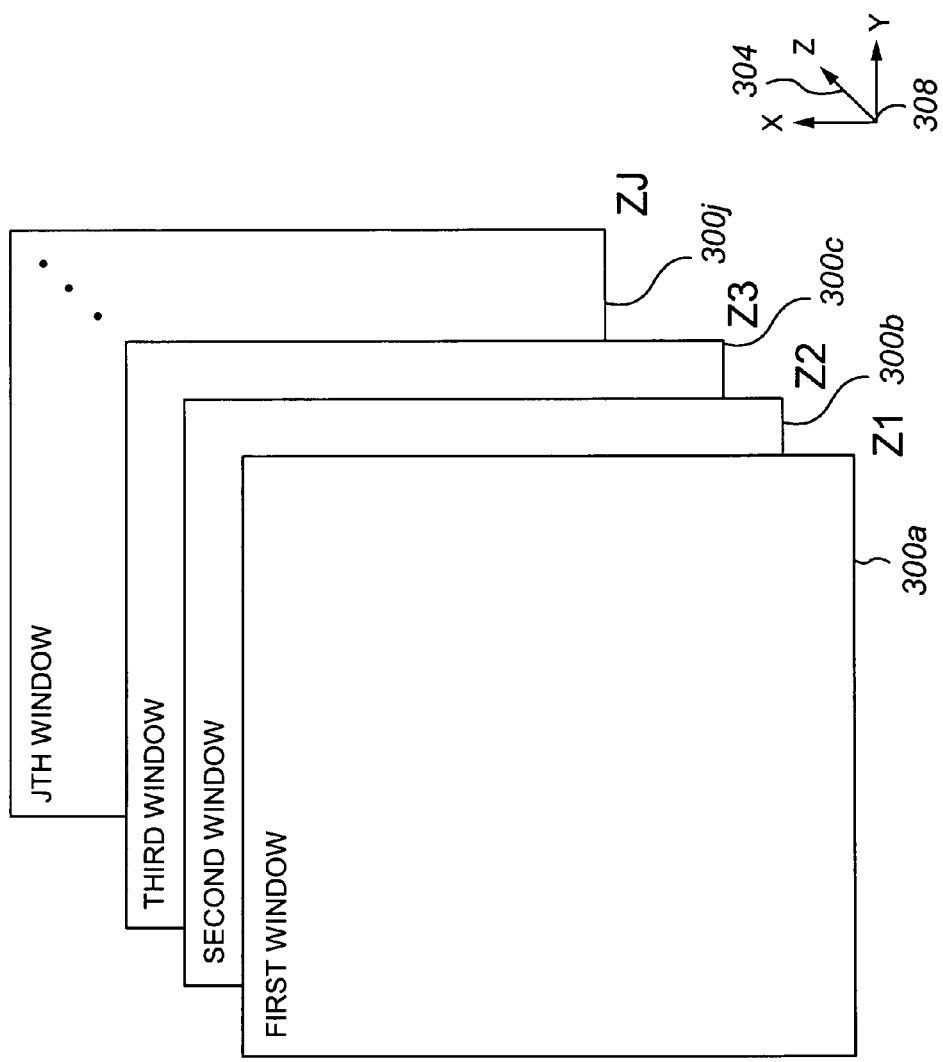
FIG. 3 depicts display segmentation according to an embodiment of the present invention.

In one configuration, the audible locating signal indicates not only the position of the cursor (or focus indicator) in two (X and Y) dimensions but also in a third (Z) dimension. This is illustrated with reference to FIG. 3. FIG. 3 depicts a number of stacked or layered windows 300a-j. Each window 300a-j represents a corresponding Z position along the Z axis 304. For example, a first window 300a represents a first Z position Z1 (which is at or closest to the coordinate system origin 308), a second window 300b a second Z position Z2, . . . and a jth window 300j a jth Z position Zj (which is farthest from the origin 308). As the cursor (or focus indicator) moves from window-to-window, it moves from one Z position to another. As in the case of cursor (or focus indicator) movement in the X and Y planes, the speakers 132R and 132L will generate a plurality of audible signals that may have varying acoustic characteristics. The varied acoustic parameter, corresponding to points along the Z axis, is different from the parameters varied for the XY positional changes. In one configuration, variations in location along the Z axis would be indicated by corresponding variations in the degree of synthesized echo. In another configuration, location along the Z axis would be indicated by the duration of the acoustic signal. (Note that synthesized echo may be the preferred approach for indicating Z axis position. This is because, when a new window is selected by the user in a graphical user interface, it automatically moves to the top of the stack. This movement can be indicated acoustically by varying the degree of synthesized echo while the signal is being played.) The signals are normally generated when the cursor (or focus indicator) reaches a designated point in each segment (e.g., as the cursor (or focus indicator) cross a window boundary) and is generated for a determined period of time while the cursor (or focus indicator) is positioned within the corresponding segment 204. If the cursor (or focus indicator) is at rest in the segment for longer than the determined period of time, the signal is ceased unless the user indicates a desire to have the signal replayed to remind him or her of the cursor (or focus indicator) position. Such a desire can be indicated by a key or button press, shaking or moving back-and-forth the tracking unit 116, and the like.

In view of the above configurations, there are a number of examples depicting the principles of the invention.

Figure 4:
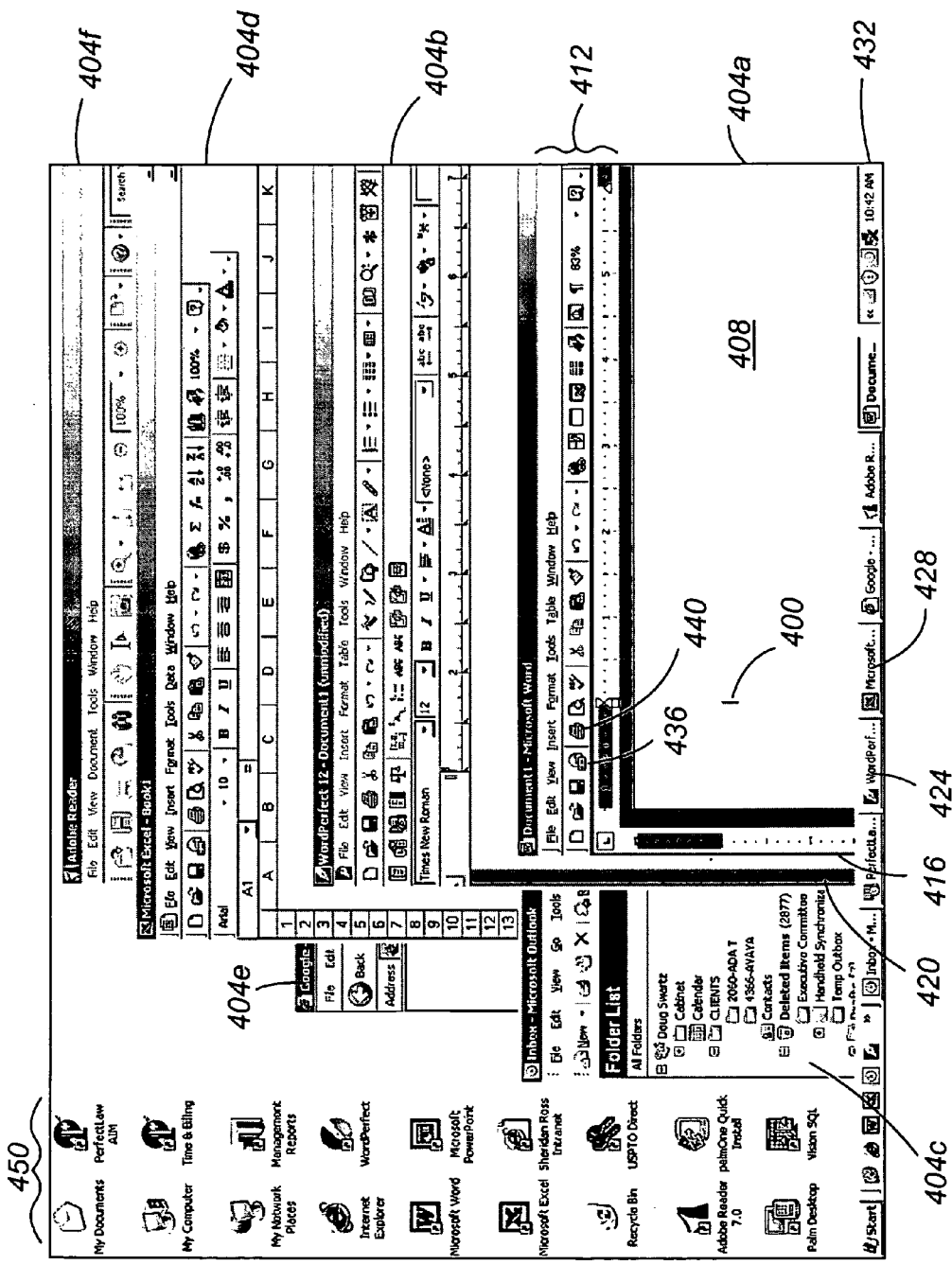
FIG. 4 is a screen shot of an exemplary display according to an embodiment of the present invention.

In a first example and with reference to FIG. 4, the cursor or pointer 400 position is tracked by audible locating signals associated with each segment 204 in which the cursor passes. In the example, a plurality of stacked windows 404a-f is depicted. The windows are layered with window 404a (which corresponds to Word™) being at the Z1 position, window 404b (which corresponds to WordPerfect™) the Z2 position, window 404c (which corresponds to Outlook ™) the Z3 position, window 404d (which corresponds to Excel™) the Z4 position, window 404e (which corresponds to Internet Explorer Browser™) the Z5 position, and window 404f (which corresponds to Adobe Reader™) the Z6 position. As the cursor is moved around the confines of the window 404a, audible locating signals of differing acoustic characteristics are generated for each segment (not shown) through which the cursor 400 passes. In this way, the user would know the cursor position without having to view the display. In one variation, a second type of audible signal having a different set of acoustic characteristics is generated when the cursor moves from a data input area 408 of the window 404a to a tool bar 412 area of the window. For example, if the locating signal for segments were to vary phase and frequency to denote different segments, the second type of locating signal could vary cadence and echo for a fixed phase and frequency. Audible identification signals to announce the various tool bar options could then be played to the user as the cursor moved along the tool bar.

In a second example and with continued reference to FIG. 4, when the cursor 400 crosses the boundary 416 of window 404a and enters window 404b, the agent 148 would generate an audible identifying signal stating "WordPerfect". As the cursor 400 crosses the boundary 420 of window 404b and enters window 404c, the agent 148 would generate an audible identifying signal stating "Outlook". In this way, the depth, or Z, position of the cursor 400 would be announced to the user. As will be appreciated, if the user clicks on the work area of one of the windows 404b-f the window selected is moved to the Z1, or first position, and the other windows rearranged accordingly. By way of illustration, if the user selects window 404e, that window is moved to the Z1 position, window 404a to the Z2 position, window 404b to the Z3 position, window 404c to the Z4 position, and window 404d to the Z5 position. Window 404f remains in the Z6 position. In one variation, the Z positions of one or more of the windows are fixed, or returned to a selected sequence, at the request of the user. In one variation, the agent 148, at the user's request, plays a series of identifying signals identifying, for each layer, the identities of the windows at that layer. By way of illustration, the signal could say "at layer 1 is Word, at layer 2 is WordPerfect, at layer 3 is Outlook, at layer 4 is Excel, at layer 5 is Internet Explorer, and at layer 6 is Adobe Reader." Alternatively, for a given layer, the agent 148 could announce the windows, or objects therein, at that layer. For example, if multiple windows are at the same layer, the agent would identify those windows and optionally the absolute or relative XY positions of the windows.

In a third example and with continued reference to FIG. 4, the user locates images, such as any of the icons 450 by matching the audible locating signals generated by movement of the cursor 400 with audible signals associated with each icon. By way of example, the user can mentally map the locations of objects by requesting the cursor to move to one or more selected objects, and, as the cursor moves from object-to-object, the agent 148 causes the locating signal associated with a segment 204 at which the object is positioned to be emitted along with an audible identifying signal for the object. Thus, when, at the request of the user, the cursor 400 moves to the "my documents" icon the agent 148 could play a locating signal for the segment at which the icon is located and, in temporal proximity to the locating signal, audibly announce "my documents". The cursor 400 would then move to the "my computer icon", and the agent 148 would play the locating signal for the segment at which that icon is located and, in temporal proximity to the locating signal, audibly announce "my computer". This process would be repeated at periodic intervals for all of the icons 450. Over time, the user would develop a mental map of his or her display. By moving the cursor 400 in the direction causing the acoustic difference(s) in locating signals between the desired icon location and current cursor location to become less, the user is able to rapidly and easily locate the desired icon.

In a fourth example, the user could submit a query (such as via a Braille keyboard) respecting a specific window. The agent 148 could move the cursor 400 (or focus indicator) to the work area of the window and ask the user to click, which would cause the window to move to the top or front of the stack. Alternatively, the agent could reorder the windows without further user involvement.

In a fifth example and with continued reference to FIG. 4, the cursor 400 is positioned between two selectable (clickable or launchable) images, which may be an icon, file folder, etc., and the agent 148 announces to the user that he or she is between the images and identifies the images. For example, if the cursor 400 were between icons 424 and 428 in the display tool bar 432, the agent 148 would announce to the user "you are in the display tool bar between the WordPerfect and Word icons". When the user moves the cursor 400 to the left, the agent 148 could announce "you are now over the WordPerfect icon" and to the right "you are now over the Word icon". In yet another illustration, the cursor 400 could be between icons 436 and 440 in an application tool bar 412. The above process would be repeated with respect to the "save" icon 436 and "print" icon 440. The same process can be repeated when the cursor 400 is near a selectable image, such as a hot spot or link. For example, if the image were a hot spot, the agent 148 can provide a signal "move to the right to activate the hot spot."

In a sixth example, when an error condition is indicated by an error signal (e.g., a chord wave), an audible locating and/or identifying signal can be placed in temporal proximity to the error signal to indicate to the user which of the windows is associated with the error signal. In this example, the locating signal would be an audible identifier of the application program corresponding to the window and/or an audible identifier of one of the segments 204 spanned at least partially by the window.

In a seventh example, a graphical image, such as a window and an icon, can move across the display to a selected position and, during motion, a plurality of locating signals can be played as the graphical image moves from segment-to-segment. By way of illustration, an email icon representing an incoming email could "fly across" the display from one edge to a window corresponding to the email application program and as the email icon moves across the screen a series of locating signals with differing acoustic characteristics are played. Such signal sets would give the user the impression of motion and be pleasing to the ear. The email icon could be associated only with selected emails, such as emails from selected sources, and not with incoming emails from other sources. In this manner, the user would be alerted when an email of interest arrives as opposed to a SPAM email or email of lesser interest (which would be sent to the window noiselessly with only the customary email arrived signal being generated).

In an eighth example, the agent 148 generates audible boundary signals as the cursor 400 traverses boundaries of images. The boundary signals are generally acoustically different from the locating signals generated for traversing segments. The boundary signals for instance can have the same set of acoustic parameters or different acoustic parameters depending on the type of image and/or boundary traversed. In the preferred embodiment, the locating signals vary frequency and phase while the boundary signals use echo or signal length to be audibly distinguishable from locating signals.

Figure 5:
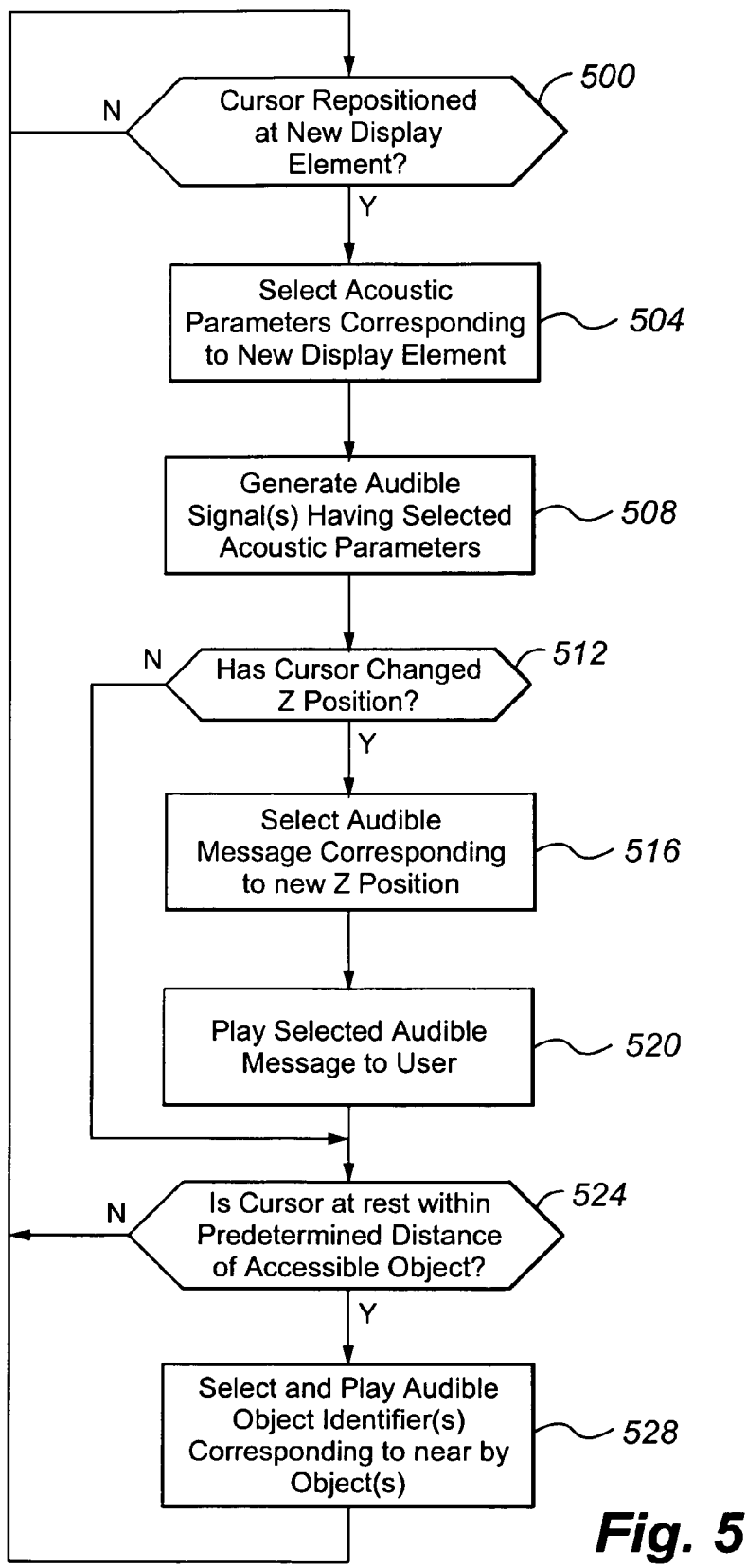
FIG. 5 is a flow chart according to an embodiment of the present invention.

FIG. 5 depicts the operation of the agent 148 according to an embodiment of the present invention.

In decision diamond 500, the agent determines whether or not the cursor (or focus indicator) has been repositioned to a new display element (or segment). If the cursor (or focus indicator) has been repositioned, the agent, in step 524, selects the acoustic parameters corresponding to the new display element and, in step 508, generates an audible locating signal(s) having the selected acoustic parameters. If the cursor (or focus indicator) has not bee repositioned, the agent returns to and repeats decision diamond 500.

In decision diamond 512, the agent determines whether or not the cursor (or focus indicator) has changed Z position. If the Z cursor (or focus indicator) position has changed, the agent, in step 516, selects an audible locating and/or identifying message corresponding to the new Z position and, in step 520, plays the selected audible message to the user. This message may be as simple as "you are not at layer 2" (for moving from layer 1 to layer 2 or layer 3 to layer 2). When the cursor (or focus indicator) position has not changed or after performing step 520, the agent proceeds to decision diamond 524.

In decision diamond 524, the agent determines if the cursor (or focus indicator) is at rest within a predetermined distance of an accessible or selectable object. If so, the agent, in step 528, selects and plays an audible object identifying signal(s) corresponding to the nearby object(s). The agent may further provide instructions to the user on where to move the cursor (or focus indicator) to position over the object(s) or automatically move the cursor to the object at the request of the user.

When the cursor (or focus indicator) is not within a predetermined distance of the accessible or selectable object or after step 528, the agent returns to and repeats decision diamond 500.

Figure 6:
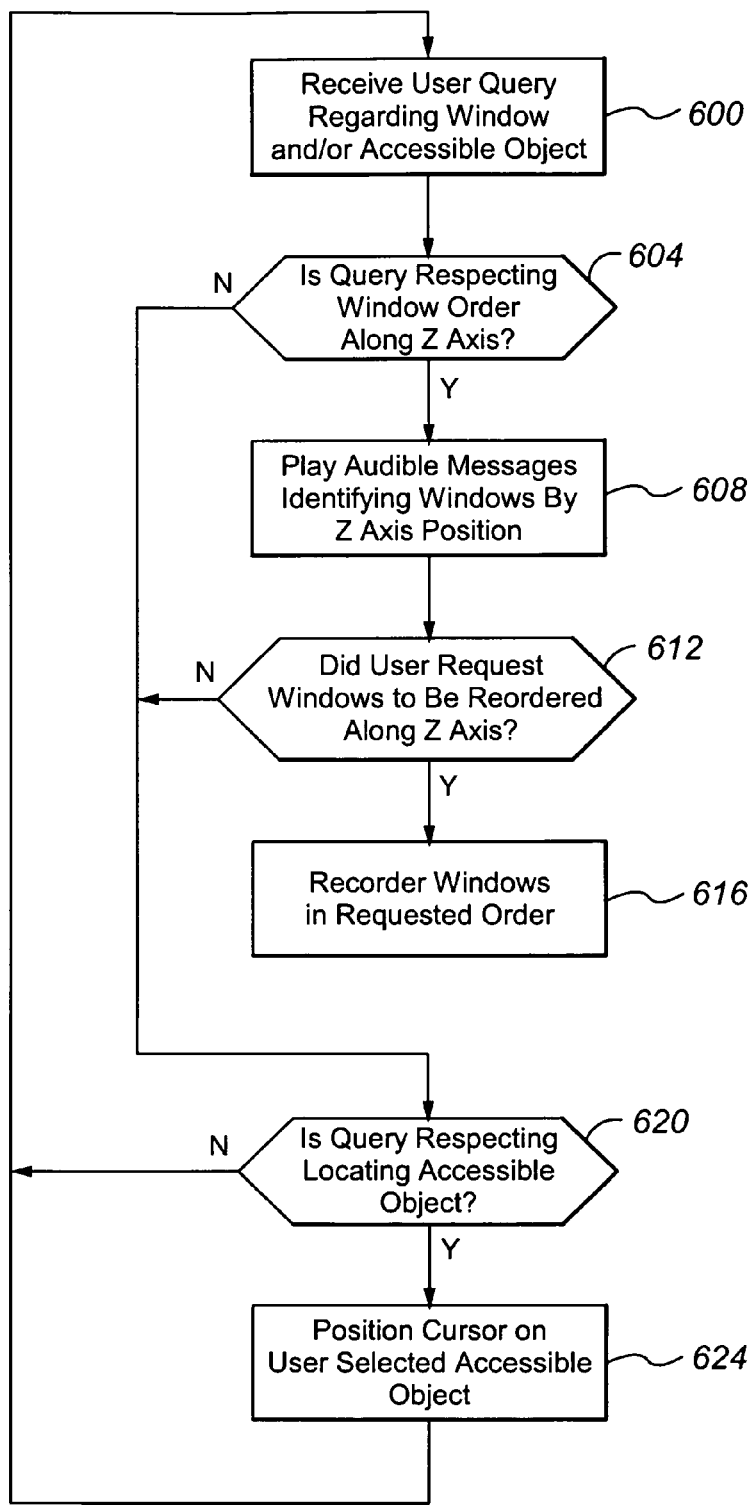
FIG. 6 is a flow chart according to an embodiment of the present invention.

FIG. 6 depicts a further operational embodiment of the present invention.

In step 600, the agent has received a user query regarding a specific window and/or accessible or selectable object.

In response, in decision diamond 604 the agent determines whether the query is respecting a window order along the Z axis. If so, the agent, in step 608, plays audible identifying messages identifying windows by Z axis position. If not or after performing step 608, the agent proceeds to decision diamond 612.

In decision diamond 612, the agent determines whether the user requested windows to be reordered along the Z axis. If so, the agent, in step 616, reorders the windows as requested by the user.

When the query does not respect the window order along the Z axis, the agent, in decision diamond 620, determines whether the query respects locating an accessible or selectable object. If so, the agent, in step 624, positions the cursor on the user selected accessible or selectable object. If not or after performing step 624, the agent returns to step 600 and awaits the next user command.

A number of variations and modifications of the invention can be used. It would be possible to provide for some features of the invention without providing others.

For example in one alternative embodiment, the present invention is not limited to visually impaired users but may be employed by visually unimpaired users. The invention may be used by computer users who are multi-tasking or engaging in other activities (such as driving) and use the audible feedback to work on the computer without having to continually look at the display. In another example, the user can be a computer junkie who has too many windows opened to track using the display tool bar. The use of audible information, particularly identification of each window by Z axis position, would be highly useful in helping the user monitor not only which windows are opened but also the relative positions of the windows.

In yet another embodiment, dedicated hardware implementations including, but not limited to, Application Specific Integrated Circuits or ASICs, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be stated that the software implementations of the present invention are optionally stored on a tangible storage medium, such as a magnetic medium like a disk or tape, a magneto-optical or optical medium like a disk, or a solid state medium like a memory card or other package that houses one or more read-only (non-volatile) memories. A digital file attachment to e-mail or other self-contained information archive or set of archives is considered a distribution medium equivalent to a tangible storage medium. Accordingly, the invention is considered to include a tangible storage medium or distribution medium and prior art-recognized equivalents and successor media, in which the software implementations of the present invention are stored.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
(a) providing, by a user interface, information to a user, the information comprising a plurality of user selectable objects, the objects being one or more of an icon or part thereof, a window or part thereof, a data field, a file folder, a link, a computer display control, a tool bar or part thereof, a desktop or part thereof, a clickable hot spot, and a drop down menu; and
(b) as a pointer and/or programmatic focus indicator changes position on the user interface, playing, by a driver, a plurality of audible locating signals to identify spatial locations of a portion of the displayed information and/or successive locations of the pointer and/or programmatic focus indicator, wherein the locating signals indicate a location relative to a three-dimensional coordinate system, wherein in an X dimension a first acoustic parameter of the locating signals is varied, and in a Y dimension a second acoustic parameter of the locating signals is varied, and in a third dimension a third acoustic parameter of the locating signals is varied, wherein:
  each spatial location of the portion of the displayed information has a unique set of first and second acoustic parameters,
  the plurality of audible locating signals of the pointer and/or programmatic focus indicator in the X and Y dimensions in the user interface are provided by frequencies at or below 1500Hz,
  changes in the X dimension use time-shifting to provide an audible difference of how the plurality of audible locating signals are perceived by a user's left ear versus right ear, with the time-shifting being an amount that is associated with a phase difference for a spatial location corresponding to the locating signal, and
  changes in the Y dimension are represented by a change to the frequency that is at or below 1500Hz.

2. The method of claim 1, wherein the user interface is a graphical user interface, wherein the pointer and/or programmatic focus indicator is the programmatic focus indicator, wherein the locating signals correspond to a spatial location of the portion of the displayed information, wherein each object has a corresponding locating signal associated therewith, wherein the display is divided into a plurality of segments, each segment being associated with a unique set of acoustic parameters, wherein the first acoustic parameter is frequency, wherein the user interface is a display, wherein a first edge of the display is at a first frequency, wherein an opposing second edge of the display is about two octaves below the first frequency, and wherein a mid-point between the first and second edges is at about one octave below the first frequency, and wherein, when the pointer and/or programmatic focus indicator is positioned in the selected segment, the locating signal played has the unique set of acoustic parameters associated with the selected segment.

3. The method of claim 1, wherein, when the pointer and/or programmatic focus indicator traverses a boundary of a selected segment, a boundary crossing signal is played, and, when, the pointer and/or programmatic focus indicator is located in a segment, the locating signal is played, wherein the boundary crossing signal differs acoustically from the locating signal, and wherein each segment corresponds to a plurality of display pixels.

4. The method of claim 1, wherein the first and second acoustic parameters are different and wherein the audible locating signals identify spatial locations of successive locations of the pointer and/or programmatic focus indicator.

5. The method of claim 1, wherein the first acoustic parameter is phase difference and the second acoustic parameter is frequency, one ear versus the other, wherein a first frequency associated with a first segment differs by less than a full musical note from a second frequency in a second adjacent segment, and wherein a first phase difference associated with a third segment differs by two or more degrees from a second phase difference associated with a fourth adjacent segment.

6. The method of claim 1, wherein the locating signals correspond to a spatial location of provided information, wherein the displayed information comprises a first object, wherein the audible locating signals are provided in conjunction with a voiced output generated by an assistive text-to-speech adjunct, and wherein, in step (b), an identifying signal identifying the first object is played in temporal proximity to a locating signal identifying a spatial location of the first object.

7. The method of claim 1, wherein the locating signal indicates a location relative to a three-dimensional coordinate system and wherein, in a third dimension, a third acoustic parameter is varied, wherein the first, second, and third acoustic parameters are different, wherein the user interface is a graphical user interface, wherein the plurality of user selectable objects comprise windows or parts thereof, wherein the plurality of windows are in a stacked relationship, wherein the first window visually nearest the user represents a first Z position, wherein the second window visually furthest from the user represents a second Z position, wherein the first and second Z positions are different and correspond to differing first and second sets of acoustic parameters, and wherein an identifying signal announces, for each of the first and second Z positions, the identities of the applications corresponding to the respective windows.

8. The method of claim 1, wherein the provided information comprises a window, wherein a second type of audible signal having a different third acoustic parameter to the first and second acoustic parameters is generated when the pointer and/or programmatic focus indicator moves from a data input area of the window to a tool bar area of the window, and wherein audible identifying signals corresponding to tool bar options are played as the pointer and/or programmatic focus indicator moves along the tool bar.

9. A non-transitory computer readable medium comprising processor executable instructions to perform the steps of claim 1.

10. A computing system, comprising:
  (a) a display operable to display information, the information comprising a plurality of user selectable objects, the objects being one or more of an icon or part thereof, a window or part thereof, a data field, a file folder, a link, a computer display control, a tool bar or part thereof, a desktop or part thereof, a clickable hot spot, and a drop down menu; and
  (b) an audible locating agent operable, as a pointer and/or programmatic focus indicator moves over the display, to play a plurality of audible locating signals to identify spatial locations of a portion of the displayed information and/or successive locations of the pointer and/or programmatic focus indicator, wherein each of the locating signal indicates a location relative to a three-dimensional coordinate system, wherein, in an X dimension, a first acoustic parameter of each of the locating signals is varied, in a Y dimension, a second acoustic parameter of each of the locating signals is varied, and in a third dimension a third acoustic parameter is varied, wherein the first, second, and third acoustic parameters are different, wherein:
    the plurality of audible locating signals of the pointer and/or programmatic focus indicator in the X and Y dimensions in the user interface are provided by frequencies at or below 1500Hz,
    changes in the X dimension use time-shifting to provide an audible difference of how the plurality of audible locating signals are perceived by a user's left ear versus right ear, with the time-shifting being an amount that is associated with a phase difference for a spatial location corresponding to the locating signal,
    changes in the Y dimension are represented by a change to the frequency that is at or below 1500Hz, and
    the third acoustic parameter comprises one or more of phase, cadence, discontinuous signal duration, interval between adjacent discontinuous signals, and synthesized echo, whereby each spatial location of the portion of the displayed information has a unique set of first, second, and third acoustic parameters.

11. The computing system of claim 10, wherein the locating signals correspond to a spatial location of the displayed information, wherein each user selectable object has a corresponding locating signal associated therewith, wherein the display is divided into a plurality of segments, each segment being associated with a unique set of acoustic parameters, wherein, when the pointer and/or programmatic focus indicator traverses a boundary of a selected segment, a boundary crossing signal is played, and, when, the pointer and/or programmatic focus indicator is located in a segment, the locating signal is played, and wherein the boundary crossing signal differs acoustically from the locating signal.

12. The computing system of claim 10, wherein each segment corresponds to a plurality of display pixels, wherein the first acoustic parameter is phase, the second acoustic parameter is frequency, and the third acoustic parameter is synthesized echo.

13. The computing system of claim 10, wherein a second type of audible signal having a different third acoustic parameter to the first and second acoustic parameters is generated when the pointer and/or programmatic focus indicator moves from a data input area of the window to a tool bar area of the window.

14. The computing system of claim 10, wherein the first acoustic parameter is phase difference and the second acoustic parameter is frequency, one ear versus the other, wherein a first frequency associated with a first segment differs by less than a full musical note from a second frequency in a second adjacent segment, and wherein a first phase difference associated with a third segment differs by at least two degrees from a second phase difference associated with a fourth adjacent segment.

15. The computing system of claim 10, wherein the audible locating signals are provided in conjunction with a voiced output generated by an assistive text-to-speech adjunct, wherein the locating signals correspond to a spatial location of displayed information, wherein the displayed information comprises a first object, and wherein the agent plays, in temporal proximity to a locating signal identifying a spatial location of the first object, an identifying signal identifying the first object.

16. The computing system of claim 10, wherein the user interface is a graphical user interface, wherein a portion of a graphical user interface comprises a plurality of windows in a stacked relationship, wherein the first window visually nearest the user represents a first Z position, wherein the second window visually furthest from the user represents a second Z position, wherein the first and second Z positions are different and correspond to differing first and second sets of acoustic parameters, and wherein an identifying signal announces, for each of the first and second Z positions, the identities of the applications corresponding to the respective windows.

17. The computing system of claim 10, wherein the displayed information comprises a window, wherein a second type of audible signal having a different third acoustic parameter to the first and second acoustic parameters is generated when the pointer and/or programmatic focus indicator moves from a data input area of the window to a tool bar area of the window, and wherein audible identifying signals corresponding to tool bar options are played as the pointer and/or programmatic focus indicator moves along the tool bar.

18. The method of claim 1, wherein a selected locating signal is time shifted relative to the user's left and right ears, whereby a first counterpart of the selected locating signal provided to the left ear is time shifted relative to a second counterpart of the selected locating signal provided to the right ear, such that the user perceives a spatial position associated with the selected locating signal.

19. A system, comprising:
a user interface for providing information to a user, the information comprising a plurality of user selectable objects, the objects being one or more of an icon or part thereof, a window or part thereof, a data field, a file folder, a link, a computer display control, a tool bar or part thereof, a desktop or part thereof, a clickable hot spot, and a drop down menu; and
an audible locating agent means for playing, as a pointer and/or programmatic focus indicator changes position on the user interface, a plurality of audible locating signals to identify spatial locations of a portion of the displayed information and/or successive locations of the pointer and/or programmatic focus indicator, wherein the locating signals indicate a location relative to three-dimensional coordinate system, wherein, in an X dimension, a first acoustic parameter of the locating signals is varied, in a Y dimension a second acoustic parameter of the locating signals is varied, and in a Z dimension a third acoustic parameter of the locating signals is varied, wherein:
the plurality of audible locating signals of the pointer and/or programmatic focus indicator in the X and Y dimensions in the user interface are provided by frequencies at or below 1500Hz,
changes in the X dimension use time-shifting to provide an audible difference of how the plurality of audible locating signals are perceived by a user's left ear versus right ear, with the time-shifting being an amount that is associated with a phase difference for a spatial location corresponding to the locating signal,
changes in the Y dimension are represented by a change to the frequency that is at or below 1500Hz, and
the third acoustic parameter comprises one or more of phase, cadence, discontinuous signal duration, interval between adjacent discontinuous signals, and synthesized echo, and wherein the first, second, and third acoustic parameters are each a different one of phase, frequency, cadence, discontinuous signal duration, interval between adjacent discontinuous signals, and synthesized echo.

20. The system of claim 19, wherein the user interface is a graphical user interface, wherein the locating signals correspond to a spatial location of provided information, wherein the pointer and/or programmatic focus indicator is the programmatic focus indicator, wherein each object has a corresponding locating signal associated therewith, wherein the display is divided into a plurality of segments, each segment being associated with a unique set of acoustic parameters, wherein the second acoustic parameter is frequency, wherein a first edge of the display is at a first frequency, wherein an opposing second edge of the display is about two octaves below the first frequency, and wherein a mid-point between the first and second edges is at about one octave below the first frequency, and wherein, when the pointer and/or programmatic focus indicator traverses a boundary of a selected segment and/or when the pointer and/or programmatic focus indicator is positioned in the selected segment, the locating signal played has the unique set of acoustic parameters associated with the selected segment.

21. The system of claim 20, wherein, when the pointer and/or programmatic focus indicator traverses a boundary of a selected segment, a boundary crossing signal is played, and, when, the pointer and/or programmatic focus indicator is located in a segment, the locating signal is played, and wherein the boundary crossing signal differs acoustically from the locating signal.

22. The system of claim 19, wherein the first acoustic parameter is phase difference and the second acoustic parameter is frequency, one ear versus the other, wherein a first frequency associated with a first segment differs by less than a full musical note from a second frequency in a second adjacent segment, and wherein a first phase difference associated with a third segment differs by two or more degrees from a second phase difference associated with a fourth adjacent segment.

23. The system of claim 19, wherein the audible locating signals are provided in conjunction with a voiced output generated by an assistive text-to-speech adjunct, wherein the locating signals correspond to a spatial location of provided information, wherein the displayed information comprises a first object, and wherein, in step (b), an identifying signal identifying the first object is played in temporal proximity to a locating signal identifying a spatial location of the first object.

24. The system of claim 19, wherein the user interface is a graphical user interface, wherein a portion of a graphical user interface comprises a plurality of windows in a stacked relationship, wherein the first window visually nearest the user represents a first Z position, wherein the second window visually furthest from the user represents a second Z position, wherein the first and second Z positions are different and correspond to differing first and second sets of acoustic parameters, and wherein an identifying signal announces, for each of the first and second Z positions, the identities of the applications corresponding to the respective windows.

25. The system of claim 19, wherein the provided information comprises a window, wherein a second type of audible signal having a different third acoustic parameter to the first and second acoustic parameters is generated when the pointer and/or programmatic focus indicator moves from a data input area of the window to a tool bar area of the window, and wherein audible identifying signals corresponding to tool bar options are played as the pointer and/or programmatic focus indicator moves along the tool bar.

26. The method of claim 1, further comprising:
determining that the pointer and/or programmatic focus indicator has stopped between first and second icons and, when stopped, the pointer and/or programmatic focus indicator is unable to select either of the first and second icons;
in response to determining that the pointer and/or programmatic focus indicator is between the first and second icons, audibly identifying by the driver the first and second icons;
audibly identifying by the driver that the pointer and/or programmatic focus indicator is between the first and second icons; and
providing an option to select one of the first and second icons.

27. The method of claim 1, further comprising:
determining that a user selectable object other than a pointer and/or programmatic focus indicator is moving across the user interface;
playing a first locating signal as the user selectable object moves from a first segment to a second segment; and
playing a second locating signal as the user selectable object moves from the second segment to a third segment, wherein the first and second locating signals give the user the impression of motion.

28. The system of claim 19, wherein the audible locating agent is further operable to determine that a user selectable object other than the pointer and/or programmatic focus indicator is moving across the user interface, play a first locating signal as the user selectable object moves from a first segment to a second segment, and play a second locating signal as the user selectable object moves from the second segment to a third segment, wherein the first and second locating signals give the user the impression of motion.

29. The method of claim 1, wherein the locating signal indicates a location relative to a three-dimensional coordinate system, wherein, in a third dimension, a third acoustic parameter is varied, wherein the first, second, and third acoustic parameters are different, and wherein the third acoustic parameter is synthesized echo.

* * * * *

UNITED STATES PATENT AND TRADEMARK OFFICE
CERTIFICATE OF CORRECTION

PATENT NO. : 8,037,414 B2
APPLICATION NO. : 11/522192
DATED : October 11, 2011
INVENTOR(S) : Paul Roller Michaelils and David S. Mohler Page 1 of 1

It is certified that error appears in the above-identified patent and that said Letters Patent is hereby corrected as shown below:

At Column 15, line 16, please change "signal" to --signals-- therein.

At Column 15, line 26, after "with," insert --wherein the user interface is a display,-- therein.

At Column 15, line 29, please delete "wherein the user interface is a display," therein.

At Column 16, line 7, after the word "comprise" insert --a plurality of-- therein.

At Column 16, line 8, please delete "the" and replace with --a-- therein.

At Column 16, line 10, please delete "the" and replace with --a-- therein.

At Column 16, line 15, please delete both occurrences of "the" therein.

At Column 17, line 47, please delete "the" and replace with --a-- therein.

At Column 17, line 48, after wherein please delete "the" and replace with --a-- therein.

At Column 17, line 53, after "Z positions," please delete both occurrences of "the" therein.

At Column 18, line 50, after "wherein the" please insert --user interface therein--.

At Column 18, line 51, please delete the word "display" therein.

At Column 19, line 26, please delete "the" and replace it with --a-- therein.

At Column 19, line 31, after "second Z positions," please delete both occurrences of "the" therein.

Signed and Sealed this
Twelfth Day of June, 2012

David J. Kappos
*Director of the United States Patent and Trademark Office*